United States Patent [15] 3,668,643
Germain [45] June 6, 1972

[54] DATA TRANSMISSION SYSTEM

[72] Inventor: Lloyd M. Germain, Los Angeles, Calif.
[73] Assignee: Data Instruments Company, Sepulveda, Calif.

[22] Filed: Aug. 14, 1970
[21] Appl. No.: 63,721

[52] U.S. Cl. ..........................340/171 R, 328/110, 331/141, 340/171 A
[51] Int. Cl. ..........................................................H04q 9/00
[58] Field of Search...............340/171, 171 A; 329/106, 126; 331/141, 179; 325/30, 320, 351; 328/110, 111

[56] References Cited

UNITED STATES PATENTS

| | | | |
|---|---|---|---|
| 3,472,965 | 10/1969 | Blossom | 340/171 X |
| 3,478,317 | 11/1969 | Hales | 340/171 X |
| 3,514,717 | 5/1970 | Rose et al. | 331/141 |
| 3,518,555 | 6/1970 | Konotchick, Jr. | 328/110 |

*Primary Examiner*—Donald J. Yusko
*Attorney*—Spensley, Horn and Lubitz

[57] ABSTRACT

A data transmission system which utilized a plurality of predetermined frequencies to transmit data is disclosed. The system is particularly useful for synchronous data transmission for example where a change from one predetermined frequency to another is utilized to code binary or trinary data. A plurality of gating signals, each separated by a finite time are generated and used to detect the presence of the predetermined frequencies. The coincidence of pulses representative of the period of the transmitted frequency and the gating signal associated with the transmitted frequency is detected and utilized to identify the transmitted frequency. The predetermined frequencies and gate durations are selected so as to allow the jitter associated with transmitted frequency to go undetected.

15 Claims, 4 Drawing Figures

LLOYD M. GERMAIN
INVENTOR.

BY Spensley, Horn & Lubitz
ATTORNEYS

LLOYD M. GERMAIN
INVENTOR

BY Spensley, Horn & Lubitz
ATTORNEYS

LLOYD M. GERMAIN
INVENTOR.

BY Spensley, Horn & Lubitz
ATTORNEYS

DATA TRANSMISSION SYSTEM

BACKGROUND OF THE INVENTION

1. Field of the Invention

The invention related to the field of data transmission.

2. Description of the Prior Art

Numerous systems utilizing a plurality of predetermined frequencies to transmit information or data over transmission means such as telephone lines are known in the art. For example, in some of these systems the presence of a particular tone or frequency is used to indicate the transmission of a binary "1" or "0." It is desirable in some of these systems to transmit a plurality of predetermined frequencies over a single channel thus allowing the transmission of a greater quantity of data over a single channel. In these situations, the data may be transmitted in numerous forms, for example it may be transmitted in trinary or binary form and encoded into the predetermined frequencies by a number of known techniques.

The detection of the various frequencies transmitted in these systems is often unreliable, especially where the various predetermined frequencies are transmitted for short duration. Typically, there are frequency instabilities in the transmitter resulting in the transmission of undesirable frequency components referred to herein as jitter. These undesirable frequency components may be caused by changes in the amplitude of the transmitted signal as well as variations from the desired predetermined frequencies. The jitter often results in the detection of one of the predetermined frequencies when in fact another predetermined frequency is being transmitted.

In the prior art devices for detecting these predetermined frequencies a plurality of gating signals one for each of the predetermined frequencies are generated one after the other as one step in detecting the transmitted predetermined frequency. These gates are utilized in a coincidence detector which detects the coincidence of a gate and pulses representative of the period of the transmitted frequency. In these systems, the jitter associated with the transmitted frequency almost always falls within one of the gating signals, thus resulting in an erroneous detection.

In the present system, finite time durations are provided between each of the gating signals thus allowing the jitter to fall between the gates and not be detected. Additionally, the frequencies and duration of each of the gates are selected so as to further reduce erroneous detections.

SUMMARY OF THE INVENTION

A data transmission system which utilizes a plurality of predetermined frequencies to transmit data is described. In the presently preferred embodiment of the invention, four different predetermined frequencies are transmitted sequentially over a single channel and the change from one frequency to another is utilized to encode data in trinary (ternary) form.

In the presently performed embodiment, the transmitter comprises a Wien bridge oscillator which includes two variable resistance-capacitance (RC) networks. The time constants of each of these RC networks are kept approximately equal to one another for all of the predetermined frequencies generated by the oscillator. This causes the amplitudes of the various frequencies generated by the oscillator to be substantially equal.

The detection of the various transmitted predetermined frequencies is performed by detecting the coincidence of a signal representative of the period of the transmitted frequency and a gating signal. The transmitted signal is converted into a series of pulses wherein the period of the pulses is equal to the period of the transmitted signal. Each pulse in addition to being coupled to the coincidence detectors is utilized to initiate a counter. The counter generates signals which in turn are utilized to generate the gating signals. A different gating signal is generated for each of the predetermined frequencies. Each gate is of an appropriate duration and is generated at an appropriate time such that it will be coincident with the pulses representative of only one predetermined frequency. A finite period separates each of the gates allowing the jitter to go undetected. The gates associated with the lower frequencies are of longer duration than those associated with the higher frequencies enabling less of the undesirable jitter from being detected.

DETAILED DESCRIPTION OF THE INVENTION

Figure 1:
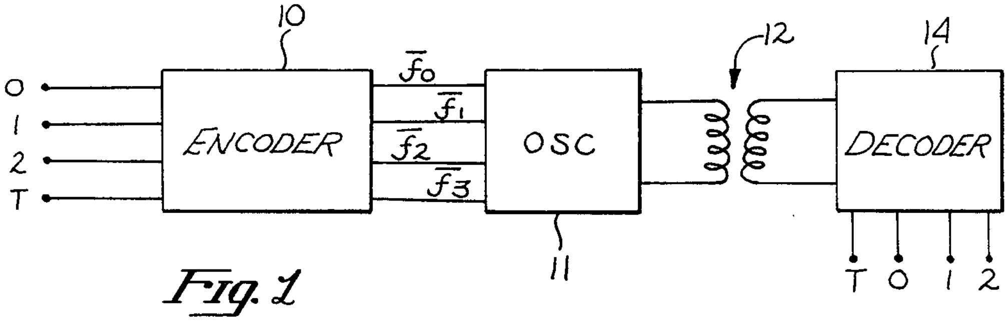
FIG. 1 is a block diagram of one embodiment of a data transmission system built in accordance with the present invention wherein a change from one predetermined frequency to another predetermined frequency is utilized to transmit information in trinary form.

The system described in the present application may be utilized to transmit synchronous data over transmission means such as telephone lines, radio and microwave links and numerous other known means where a plurality of predetermined frequencies are encoded with data or information at the transmitter and decoded at a receiver. The data may be encoded in such a way that the presence of one predetermined frequency indicates a binary "1" or "0" may be encoded in such a way that the change from one predetermined frequency to another is used to indicate a particular quantum of data such as binary "1" or "0." As will be readily apparent the present system is particularly useful where the various predetermined frequencies are transmitted sequentially, that is, one after another. The present system may be utilized wherein two groups of predetermined frequencies are multiplexed or otherwise transmitted over a single transmission means or channel and where two receivers as disclosed herein are utilized to detect each group of predetermined frequencies.

The present invention will be described in detail wherein data is transmitted in a trinary or ternary form. The word trinary or ternary, as used herein refers to a scheme for defining information wherein those discrete elements are utilized. These elements of the trinary scheme are analogous to the bits "0" and "1" of a binary number. By way of example, the trinary number 12012 would have a value to the base ten of $2\cdot3^0+1\cdot3^1+2\cdot3^3+1\cdot3^4=140$. Assuming that the first element (1) of the trinary numbers is the most significant. The number 140 in binary form would be 10001100 which is standard notation is equal to $2^2+2^3+2^7= 140$. In the system as described herein four predetermined frequencies $f_0, f_1, f_2$ and $f_3$ shall be utilized. The trinary information or data in the detailed description of this patent will be encoded in such a way that a trinary 0 shall be indicated by the change from $f_0$ to $f_1$ or $f_1$ to $f_2$ or $f_2$ to $f_3$ or $f_3$ to $f_0$. Thus, the trinary 0 is indicated by a change from one predetermined frequency to the next highest frequency except in the case when $f_3$ is transmitted and then by a change from $f_3$ to $f_0$. The trinary 1 shall be encoded for the purpose of explanation herein by a change from one predetermined frequency to a second higher predetermined frequency that is a change from $f_0$ to $f_2$ or a change from $f_1$ to $f_3$ or change from $f_3$ to $f_1$. A trinary 2 shall be encoded by a change from one frequency to a third higher frequency that is from a change from $f_0$ to $f_3$ or from $f_1$ to $f_0$ or from $f_3$ to $f_2$. It is readily apparent that the encoding scheme utilized to encode the trinary elements is arbitrary and numerous other schemes may be utilized. A more detailed discussion of a trinary data system is disclosed in co-pending application Ser. No. 859,966, filed Sept. 22, 1969.

It will be apparent to one skilled in the art that while in the present description a change from one predetermined frequency to another is utilized to encode data, the system described herein may be utilized to transmit data when the transmission of a particular frequency, itself, is an indication of the transmission of particular data. The advantages of transmitting data as described herein, that is over a quadrinary channel where a change from one frequency to another is utilized to encode data is explained in the above referred copending application.

Referring to FIG. 1 a block diagram comprising an encoder 10, as oscillator 11, a transmission line 12, and decoder 14 is illustrated. The input to the encoder comprises signals representative of a trinary 0, trinary 1, trinary 2, and a timing signal to indicate the time at which a trinary element is applied to encoder 10. The output of decoder 14 consists of the same information applied to encoder 10, that is a trinary 0, a trinary 1, a trinary 2, and a timing signal. The function of encoder 10 is to receive the trinary information and to convert it or encode it into signals representative of the four predetermined frequencies $f_0$, $f_1$, $f_2$, and $f_3$ these signal being utilized to subsequently generate frequencies which are transmitted over transmission line 12. The output from encoder 10 has been shown as $\overline{f_0}$, $\overline{f_1}$, $\overline{f_2}$ and $\overline{f_3}$ to indicate that the output of encoder 10 may be discrete signals such as a DC signal. These signals are used by oscillator 11 to generate the predetermined frequency indicated by the signal. For example if a signal appeared on the line indicated by $\overline{f_0}$ this would be an indication that oscillator 11 should generate $f_0$. Thus, the output of encoder 10 consists of a signal on one of the four lines labeled $\overline{f_0}$ through $\overline{f_3}$.

Encoder 10 performs the function of encoding the trinary information in accordance with the arbitrary scheme previously discussed so that a change of state occurs at the output of encoder 10 for every trinary element applied to encoder 10. Encoder 10 may utilize any one of numerous conventional circuits, for example, encoder 10 may comprise a four bit shift register wherein the numer of bits in the register is represented by a signal appearing on one of the lines $\overline{f_0}$ through $\overline{f_3}$ respectively. Thus if a single bit appears in the register a signal will appear on $\overline{f_0}$, if two bits appear in the register a signal will appear $\overline{f_1}$ and so on. The shift register would be mechanised such that a single bit would be added to the contents of the register if a trinary 0 was applied to the encoder, two bits would be added to the register if a trinary 1 was applied to the encoder 10 and finally three bits would be added to the shift register if a trinary 2 was applied to encoder 10. The shift register, when containing four bits, would be mechanised such that the addition of an additional bit would clear the register and cause it to have a single bit remaining within the register. This shift register would cause the trinary signals applied to encoder 10 to be encoded or converted in accordance with the arbitrary rule previously discussed. The shift register and its associated circuitry may be built utilizing commonly known components and technology. Other circuit for accomplishing the encoding will also be apparent to one skilled in the art.

Figure 2:
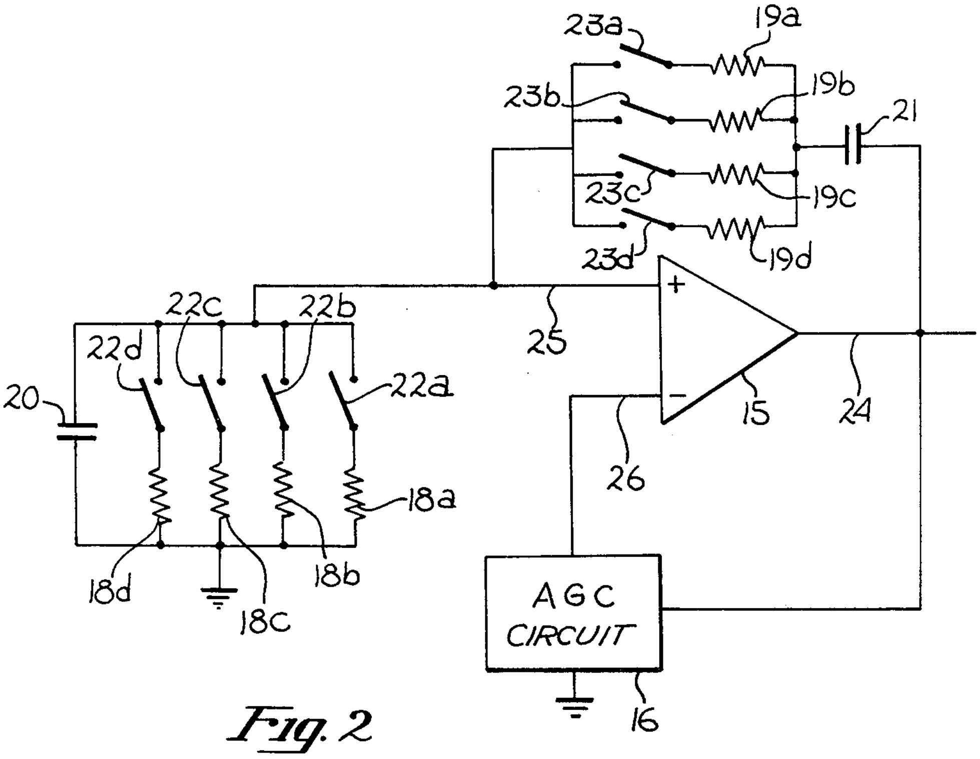
FIG. 2 is a circuit diagram for an oscillator circuit utilized to produce the four predetermined frequencies utilized in the system of FIG. 1.

Referring to FIG. 2, one embodiment of oscillator 11 of FIG. 1 is illustrated. The oscillator of FIG. 2 comprises a Wien-bridge oscillator, the operation of which is known in the prior art and may be found in numerous standard texts. The oscillator comprises an operational amplifier 15 having an output lead 24 an a pair of input leads 25 and 26. A series RC network comprising capacitor 21 and the resistors **19*a* through 19d are connected across the output lead 24 and the input lead 25. A parallel RC network comprising capacitor 20 and resistors 18a through 18d are coupled between the input lead 25 and ground. Switches 23a through 23*d* are coupled in series with resistors 19*a* through 19*d*, respectively, so that any or all of the resistor 19*a* through 19*d* may be selectively connected into the RC network connected between the output lead 24 and the input lead 25. Likewise, switches 22*a* through 22*d* are coupled in series with resistors 18*a* through 18*d*, respectively, thus allowing any or all of the resistors 18*a* through 18*d* to be selectively coupled between input lead 25 and ground. The input lead 26 is coupled to an automatic gain control circuit 16. This circuit also being coupled to the output lead 24 of the operational amplifier 15. The AGC circuit 16 senses the output of amplifier 15 and supplies a signal on input lead 26 of an appropriate magnitude so that the amplitude of the output signal from amplifier 15 remains substantially constant. The AGC circuit 16 averages the output from amplifier 15 in order to generate this controlling signal which is applied to the amplifier on lead 26. This controlling technique is commonly known in the prior art. The components comprising the Wien-bridge oscillator illustrated in FIG. 2 may be commonly known and utilized parts. For example, the switches 23*a* through 23*d* and 22*a* through 22*d*** may be solid state device commonly utilized for such applications.

One problem encountered in transmitting data with the system illustrated in FIG. 1 is that it is sometimes difficult to distinguish one predetermined frequency from another. One factor which contributes to this difficulty is that the output oscillator 11 particularly when the oscillator changes from one predetermined frequency to another does not produce an output signal of the same amplitude for the various predetermined frequencies. The changes in amplitude contribute to the jitter and often results in detecting one predetermined frequency when another is actually being transmitted. This problem is aggravated when the predetermined frequencies are switched in rapid succession and where only a few cycles of each predetermined frequency are transmitted before a change occurs in the transmitted frequency. It has been found that by utilizing the Wien-bridge oscillator of FIG. 2 the output from operational amplifier 15 can be made to be substantially constant provided that the RC time constants for the networks comprising capacitor 22 and resistors **19*a* through 19*d* and for the network comprising capacitor 20 and resistors 18a through 18*d* are substantially equal to one another. While maintaining the time constants of these two RC networks substantially equal, only minor corrections are required to be made by the AGC circuit 16 and the amplitude of the frequencies appearing on lead 24** remains substantially constant.

To implement the Wien-bridge oscillator of FIG. 2 in the system illustrated in FIG. 1 each of the four output leads from encoder 10 would be utilized to actuate a switch in each of the RC networks of the oscillator in FIG. 2. For example the output lead from encoder 10 labeled $\overline{f_0}$ could actuate switches **22*a* and 23*a*, the output signal that would appear on $\overline{f_1}$ could actuate switches 22*b* and 23*b* and so on. The time constant for resistor 19*a* and capacitor 21 must be substantially equal to the time constant for resistor 18*a* and capacitor 20 and likewise the time constant for capacitor 21 and resistor 19*b* should be substantially equal to the time constant for resistor 18*b* and capacitor 20 and so on in order to achieve the constant output amplitudes previously discussed. Also, the time constants for each of the combinations for example resistor 19*a* and capacitor 21 and resistor 18*a* and capacitor 20** should be selected in order to obtain the desired frequency for, example $f_0$. The selection of the time constant in order to produce the desired predetermined frequency may be done in accordance with well-known techniques. It is of course possible to achieve the same results as previously discussed by utilizing a single resistor and a plurality of capacitors in each of the RC networks.

Figure 3:
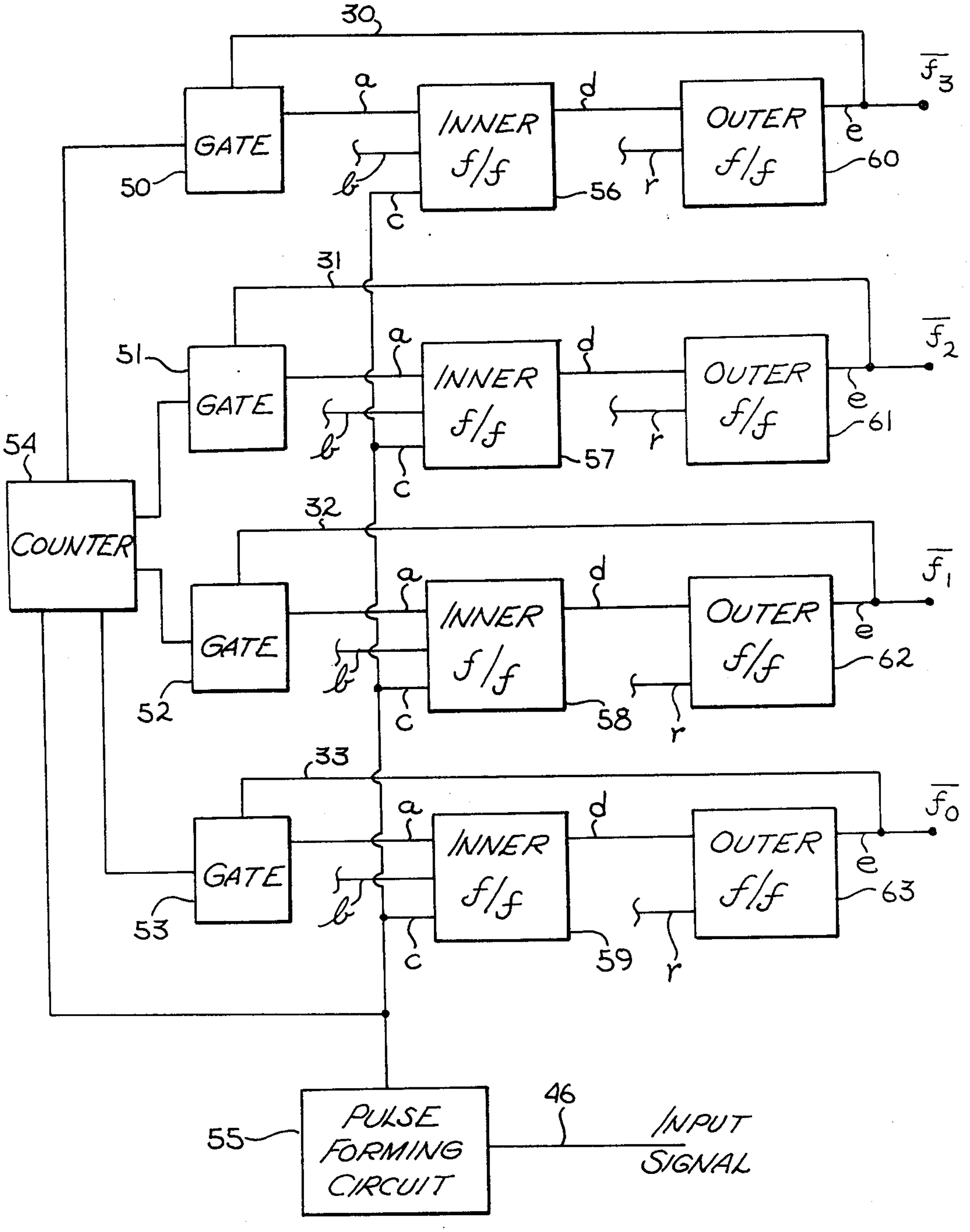
FIG. 3 is a block diagram of a circuit for detecting the transmitted predetermined frequencies for a system which utilizes four predetermined frequencies.

The decoder 14 of FIG. 1 comprises means for detecting the predetermined frequencies and a means for converting the results of this detection into the trinary form comprising the trinary 0, 1, and 2. In FIG. 3 a block diagram of a means for detecting the predetermined frequencies on the transmission line 12 of FIG. 1 is illustrated. The input signal, lead 46 is coupled to the transmission line 12 of FIG. 1 allowing the various predetermined frequencies transmitted over the transmission line 12 to be applied to the pulse forming circuit 55. The output from the block diagram illustrated in FIG. 3 comprises the signals illustrated as $\overline{f_0}$ through $\overline{f_3}$ these signals correspond to the $\overline{f_0}$ through $\overline{f_3}$ illustrated in FIG. 1. The remainder of the circuitry of decoder 14 may comprise any circuitry for converting the signals present on the leads $\overline{f_0}$ through $\overline{f_3}$ of FIG. 3 into the trinary 0, 1, and 2. Anyone of numerous circuits may be used for this purpose. One method of performing this function is to utilize digital circuitry to implement the following algorithm: A numerical value or number is assigned to each of the signals for example $\overline{f_0}$ may be assigned the number 1, $\overline{f_1}$, the number 2, $\overline{f_2}$, the number 3, $\overline{f_3}$, the number 4. By subtracting the number representative of the previous signal from the number represented by the present signal the resultant number, if positive, minus the number 1 will equal the trinary element. If the result of the subtraction is a negative number the addition of the number 3 to the negative number will result in the correct trinary number. This algorithm may be implemented utilizing commonly known circuitry and techniques. This algorithm implements the arbitrary rule utilized to encode the trinary elements in encoder 10. It is obvious that if other schemes are utilized to encode the trinary elements in encoder 10 an appropriate algorithm may be readily found to decode the change from one predetermined frequency to another into the trinary elements.

Pulse forming network 55 of FIG. 3 is utilized to generate pulses which are separated in time by periods which are proportional to the input signal applied on lead 46. For example if the input signal comprises a 1 kc sinusoidal wave the output from circuit 55 would comprise a series of pulses which frequency is a multiple of 1 kc. The pulse forming may be accomplished utilizing commonly known electrical circuitry for example the sinusoidal waves may be converted into a square wave and the leading edges of the square waves differentiated to produce pulses. In the preferred embodiment of the present invention and for the purposes of explanation of the circuitry of FIG. 3, it will be assumed that pulse forming circuit 55 produces pulses which periods correspond to the period of the input signal applied to circuit 55.

Figure 4:
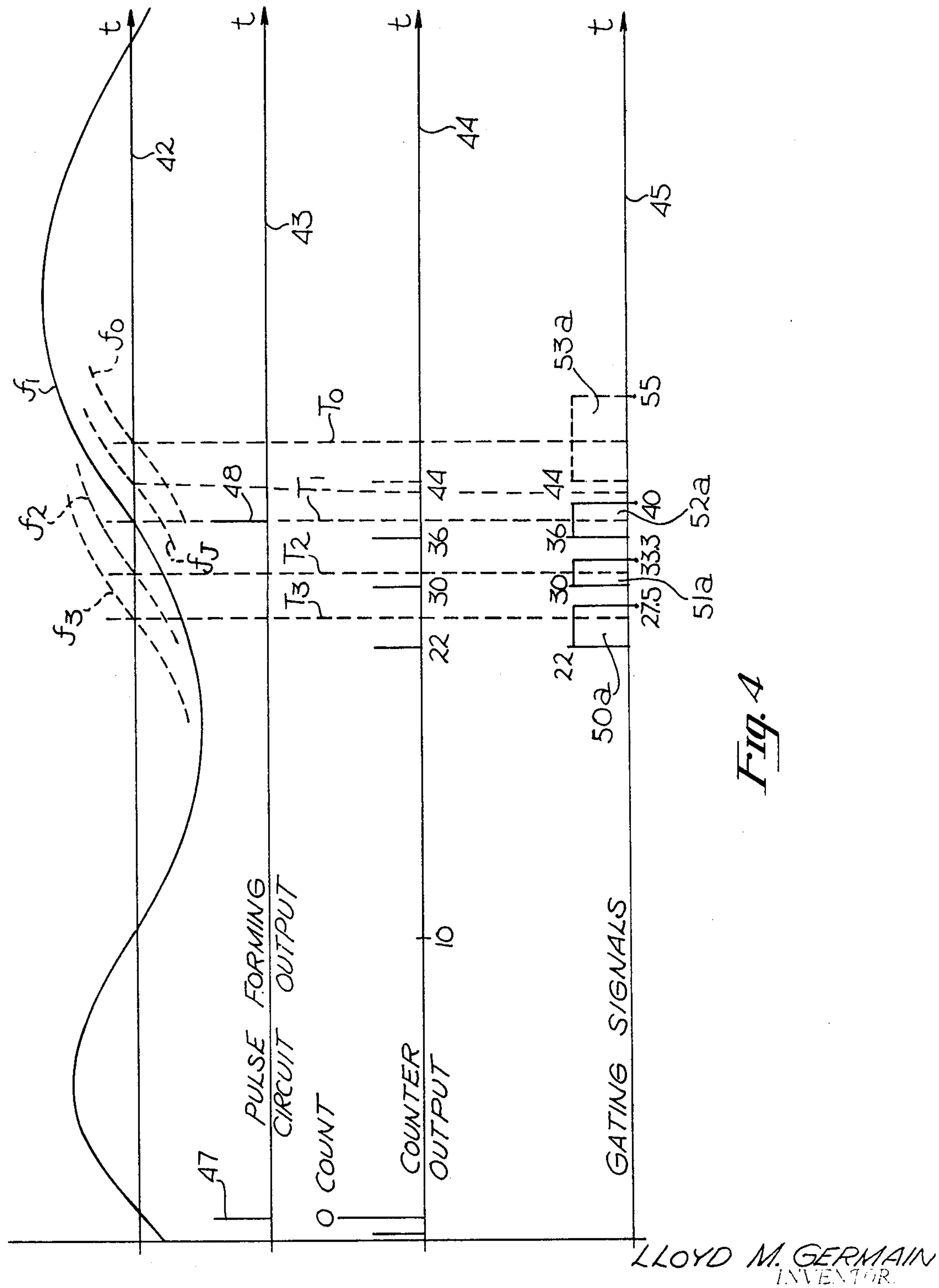
FIG. 4 is a graph illustrating the transmitted frequencies associated with the trinary system and various other wave forms associated with the circuit of FIG. 3.

Referring to FIG. 4 a predetermined frequency $f_1$ is illustrated on time-axis 42. Note also that for purposes of explanation the frequencies $f_0$, $f_2$ and $f_3$ are illustrated in broken lines. The output from the pulse forming circuit 55 is illustrated on the time-axis 43 as pulses 47 and 48. The period between pulses 47 and 48 correspond to the period of the predetermined frequency $f_1$. If another predetermined frequency, for example $f_0$ is applied to the pulse forming circuit 55 then likewise pulses would be generated corresponding to the period of $f_0$. For example a pulse would be generated in this situation at the time indicated at $T_0$ in FIG. 4.

Counter 54 may be any one of numerous electrical or mechanical means utilized for counting and for producing output signals at predetermined counts or times. In the presently preferred embodiment of the invention counter 54 utilizes a 50 kc crystal. The output from counter 54, which are signals corresponding to predetermined counts or times, are applied to the gates 50, 51, 52 and 53. The counter 54 is coupled to the pulse forming circuit 55 and is reset and begins recounting each time it receives a pulse from the pulse forming circuit 55.

The gates 50, 51, 52 and 53 may be any electrical means which generate a gating signal upon receiving a signal from the counter 54, said gating signal have a predetermined duration. The gates 50 through 53 may be such commonly known and utilized circuits as monostable multi-vibrators. As will be pointed out, in the presently preferred embodiment of the invention the gating signal produced by each of the gates 50 through 53 are of different duration. Each of the gates 50 through 53 are adaptable for not producing gating signals when a signal is applied from counter 54 if a signal is applied to the gates on leads 30 through 33, respectively. Thus, signals applied on leads 30 through 33 affectively lockout the gating signals produced by gates 50 through 53, respectively. This function may be performed utilizing commonly known digital circuitry.

The inner flip-flops 56 through 59 may be identical circuits each comprising a two state circuit such as a flip-flop. The state of the flip-flop 56 through 59 may be detected on lead *d*. For the purposes of discussion it will be assumed that the flip-flops are in a "high" state if a signal appears on lead *d* and conversely are in a "low" state if no signal appears on lead *d*. The flip-flops 56 through 59 will change states if a signal is received on lead *c* provided that a gating signal is simultaneously present on lead *a*. The flip-flops will also be reset to their "low" state when a reset signal is received on lead *b*. Lead a of flip-flops 56 through 59 are coupled to the outputs from gates 50 through 53, respectively. The lead *c* from flip-flops 56 through 59 are coupled to the output of the pulse forming circuit 55. The leads *b* from the flip-flops 56 through 59 are coupled to a common junction and their function and use will be explained in conjunction with the operation of the circuit of FIG. 3.

The outer flip-flops 60 through 63 likewise comprise two state circuits such as flip-flops. The outer flip-flops also have a "high" state and "low" state and it will be assumed that a signal is produced on lead *e* when a flip-flop is in its "high" state and that the flip-flops 60 through 63 will change from their "low" state to a "high" state when the inner flip-flops 56 through 59, respectively, change from a "high" state to a "low" state. For example a signal will be produced on lead *e* of flip-flop 60 only when the inner flip-flop 56 goes from a "-high" state to a "low" state. A signal applied to the leads *r* of flip-flops 60 through 63 cause the outer flip-flops to be reset to their "low" state. The outer flip-flops 60 through 63 may be identical. Leads *e* of the outer flip-flops 60 through 63 are coupled to leads 30 to 33, respectively, which in turn are connected to gates 50 through 53, respectively. Thus, when any of the outer flip-flops 60 are in a "high" state the gate coupled to that inner flip-flop will not produce a gating signal.

Referring to FIG. 3 the circuit for detecting the predetermined frequencies utilizes a gate, an inner flip-flop and an outer flip-flop for each of the predetermined frequencies to be detected. For example, frequency $f_0$ utilizes a gate 53, an inner flip-flop 59 and an outer flip-flop 63. The presence of frequency $f_0$ on lead 46 will be indicated by the appearance of a signal on lead *e* of flip-flop 63, said signal being labeled as $\overline{f_0}$. Likewise the presence of the frequencies $f_1$ through $f_3$ on lead 46 will be indicated by the presence of a signal on leads *e* of the outer flip-flops 62 through 60, respectively.

For the purposes of explanation assume that a frequency $f_1$ is applied to lead 46 of the pulse forming circuit 55 and that the inner flip-flops and outer flip-flops have been all reset to their "low" state. Referring to FIG. 4 the signal $f_1$ is illustrated on time-axis 42 and the output of the pulse forming circuit 55 is illustrated on axis 43. The output from counter 54 is illustrated on time-axis 44; the output from the gates 50 through 53 is illustrated on the time-axis 45. Upon receiving the pulse from circuit 55 counter 54 begins counting and transmits a pulse at count 22, to gate 50, a pulse at count 30 to gate 51 and a pulse at count 36 to gate 52. Upon receiving the pulse at count 22, gate 50 generates a gating signal 50a illustrated on time-axis 45 which is transmitted to flip-flop 56. Likewise, upon receiving a pulse at count 30 gate 51 generates a gating signal 51*a* which is transmitted to flip-flop 57 and so on. Note that the periods of the predetermined frequency intended to be detected by each of the inner flip-flops falls within the gate supplied to the flip-flop. For example as indicated in FIG. 4 the vertical line $T_3$ which is the period for the frequency $f_3$ fall within the gating signal 50*a*.

Assuming that a pulse is received on any of the inner flip-flops 56 through 59 simultaneously with the application of a gating signal to that flip-flop, that flip-flop would immediately change state and to be set at a "high" state. For example if the pulse 48 shown in FIG. 4 were received during the gating signal 52*a* the inner flip-flop 58 would be set to a "high" state, note though that when this occurs no change occurs in the outer flip-flop 62. Note also that when the pulse 48 is simultaneously transmitted to counter 54, counter 54 begins counting again thus in actual practice if pulse 48 were received by the counter 54, the pulse from counter 54 at count 44 and the gating signal 53*a* shown in FIG. 4 would not actually appear.

These items have been shown in FIG. 4 in order to more fully explain the system and in particular the detection of the frequency $f_0$. Assuming that after flip-flop 58 is set in a "high" state and a coincidence again occurs between the gating signal from gate 52 and a pulse from circuit 55 apply to lead *c* of the inner flip-flop 58, this would cause the inner flip-flop 58 to change state to a "low" state. When this occurs the outer flip-flop 62 would change to a "high" state and a signal would appear on lead *e* of flip-flop 52 this lead being labeled $\overline{f_1}$. Thus, when this occurs it would be an indication that the frequency $f_1$ has been detected.

When the outer flip-flop 62 is changed to a "high" state a signal is transmitted on lead 32 to gate 52 and prevents the generation of additional gating signals, also, by connections not illustrated when the outer flip-flop 62 is set at a "high" state all the inner flip-flops and all the outer flip-flops except for flip-flop 62 is set at a "low" state. Likewise if one of the other outer flip-flops were set at a "high" state it would cause all the inner flip-flops and all the outer flip-flops except the one set, to be reset at a "low" state. This may be accomplished with commonly used logic circuitry and has not been shown since it would unduly complicate FIG. 3. The purpose of the signal on lead 32 is to prevent the redetection of the same frequency after the outer flip-flop 62 has been set in a "high" state. As previously explained the coding technique utilized herein requires a change of state from one predetermined frequency to another for every trinary element transmitted thus the change from one frequency to another is utilized to determine the information transmitted rather than the presence of any one particular frequency.

Assuming after the outer flip-flop 62 has been set in a "-high" state that another frequency such as $f_0$ is applied to lead 46. When this occurs and the outer flip-flop 63 is set to a "-high" state it will cause the outer flip-flop 62 to be reset at a "low" state and in accordance with the arbitrary coding technique utilized for purposes of illustration herein, the change from $f_0$ to an $f_1$ would indicate that a trinary 0 had been transmitted.

It has been found that the detector of FIG. 3 operates most effectively where a time interval exists between each of the gating signals. Referring to axis 45 of FIG. 4 a time interval when no gating signal is generated exists between each of the signals for example between signals 50*a* and 51*a* and again between 51*a* and 52*a* and again between 52*a* and 53*a*. By properly selecting the length of each gate the jitter associated with the predetermined frequencies can remain undetected. Assume, for example, that the oscillator 11 of FIG. 1 is caused to change from predetermined frequency $f_0$ to predetermined frequency $f_1$ but during the transient period generates a frequency $f_j$ illustrated on time-axis 42 of FIG. 4. The pulse which would be generated by circuit 55 upon receiving $f_j$ of FIG. 3 would not be detected by any of the inner flip-flops since the pulse would fall between the gates 52*a* and 53*a*.

It has also been found that the circuit of FIG. 3 performs well where the duration of the gating signals associated with the higher frequencies is shorter than the duration of the gates associated with the lower frequencies. For example signal 51*a* which is associated with frequency $f_2$ is shorter in duration than the signal 52*a* associated with frequency $f_1$. The signal 52*a* lasts from count 30 to count 33.3 while the signal 52*a* lasts from count 36 to 40. (This assumes that $f_0$ is the lowest predetermined frequency and that $f_3$ is the highest predetermined frequency). Note also that it is not necessary for the beginning of gate 50*a* to begin near a time corresponding to $T_3$ since it is unlikely that a false detection will be made before this time.

It has also been found that by providing greater periods between the lower predetermined frequencies as compared to the higher predetermined frequencies that less error occurs in the frequency detections; for example, if $f_0$ is taken to be 1 kc, $f_1$ to be 1.26 kc; $f_3$ at 1.587 kc and $f_3$ at 2 kc. Assume, that for purposes of discussion that it is desirable not to detect a frequency component which varies more than 10 percent from the predetermined frequencies. In order to do this, longer gating signals are required at the lower frequencies than at the higher frequencies. In order to accommodate these longer gating signals for the lower frequencies, the frequencies are spaced as previously shown. For example it can be shown that 206 microseconds exist between the period for the frequencies $f_0$ and $f_1$ while 164 microseconds exist between the periods for the $f_1$ and $f_2$. Thus, the gating signal 53*a* may be longer in duration than the gating signal 52*a*. This allows a maximum amount of jitter to go undetected. The selection of the separations between the predetermined frequencies and the duration of the gating signals may be made utilizing commonly known mathematical progressions.

Numerous variations to the circuit shown in FIG. 3 are readily apparent which would allow the detection of a predetermined frequency after a different sequence of events. For example, in some applications it may be desirable to detect three pulses which correspond to a single predetermined frequency before an indication is given by the circuit that that predetermined frequency has been detected. This may be accomplished with the circuit of FIG. 3 by adding an additional column of flip-flops after the outer flip-flops. It may be also desirable in some application to require two consecutive detections of pulses by one of the inner flip-flops before an outer flip-flop is set. This may be readily accomplished by a simple logic circuit which would set all the inner flip-flops to a "low" state except the one which detected a coincidence of a pulse from circuit 55 and a gating signal. Numerous other variations to the circuit of FIG. 3 will be apparent to one skilled in the art.

Thus, a system for transmitting data utilizing a plurality of predetermined frequencies has been described wherein the detection means for detecting the transmitted frequency substantially eliminates the detection of jitter or undesirable frequencies.

I claim:

1. In a system for sequentially transmitting a plurality of predetermined frequencies an apparatus for detecting the transmitted frequency comprising:

means for generating an electrical signal representative of the period of the transmitted frequency;

gate generation means for generating a plurality of gating signals each of said gates being separate from one another by a finite period of time and with no gating signals being generated during said finite period of time; and detection means for detecting the coincidence of at least one of said gating signals and said electrical signal representative of the period of the transmitted frequency coupled to said gate generation means and said means for generating electrical signals representative of the periods of the transmitted frequencies;

whereby the detection of said coincidence is indicative of the transmitted frequency.

2. The apparatus defined in claim 1 wherein at least one gating signal is generated for each predetermined frequency by said gate generation means.

3. The apparatus as defined in claim 2 wherein at least one of the gating signals generated for a lower predetermined frequency is longer in duration that a gating signal generated for a higher predetermined frequency.

4. The apparatus defined in claim 2 including a separate detection means for each predetermined frequency and wherein said gate generation means transmits at least one gating signal to each of said detection means.

5. The system defined in claim 1 wherein at least three predetermined frequencies are used and wherein the number of cycles between one frequency and the next higher frequency is greater than the number of cycles between said next higher frequency and the next higher frequency.

6. The system defined in claim 2 wherein at least three predetermined frequencies are used and wherein the number of cycles between one frequency and the next higher frequency is greater than the number of cycles between said next higher frequency and the next higher frequency.

7. The system defined in claim 4 wherein at least one of the gating signals generated for a lower predetermined frequency is longer in duration than a gating signal generated for a higher predetermined frequency.

8. The system defined in claim 7 wherein four predetermined frequencies are utilized.

9. A system for transmitting data by coding a plurality of predetermined frequencies comprising:

a transmitter for encoding said data into said predetermined frequencies;

transmission means coupled to said transmitter; and a receiver coupled to said transmission means for detecting said predetermined frequencies comprising:

means for generating an electrical signal representative of the period of the transmitted frequency;

gate generation means for generating a plurality of gating signals each of said gating signals being separate from one another by a finite period of time and with no gating signals being generated during said finite period of time; and detection means for detecting the coincidence of at least one of said gating signals and said electrical signal representative of the period of the transmitted frequency coupled to said gate generation means and said means for generating electrical signals representative of the periods of the transmitted frequencies;

whereby the detection of said coincidence is indicitive of the transmitted frequency.

10. The system defined in claim 9 wherein said transmitter includes a Wien-bridge oscillator for generating said predetermined frequencies, said oscillator having at least two resistor-capacitor networks.

11. The system defined in claim 10 wherein the time constants of said two resistor-capacitor networks remain substantially equal for at least two of the predetermined frequencies generated by said oscillator.

12. The system defined in claim 10 wherein at least one of the gating signals generated for a lower predetermined frequency is longer in duration than a gating signal generated for a higher predetermined frequency.

13. The system defined in claim 12 including a separate detection means for each predetermined frequency and wherein said gate generation means transmits at least one gating signal to each of said detection means.

14. The system defined in claim 9 wherein at least three predetermined frequencies are used and wherein the number of cycles between one frequency and the next higher frequency is greater than the number of cycles between said next higher frequency and the next higher frequency, 15. The system defined in claim 14 wherein at least three predetermined frequencies are used and wherein the number of cycles between one frequency and the next higher frequency is greater than the number of cycles between said next higher frequency and the next higher frequency.

* * * * *